United States Patent Office

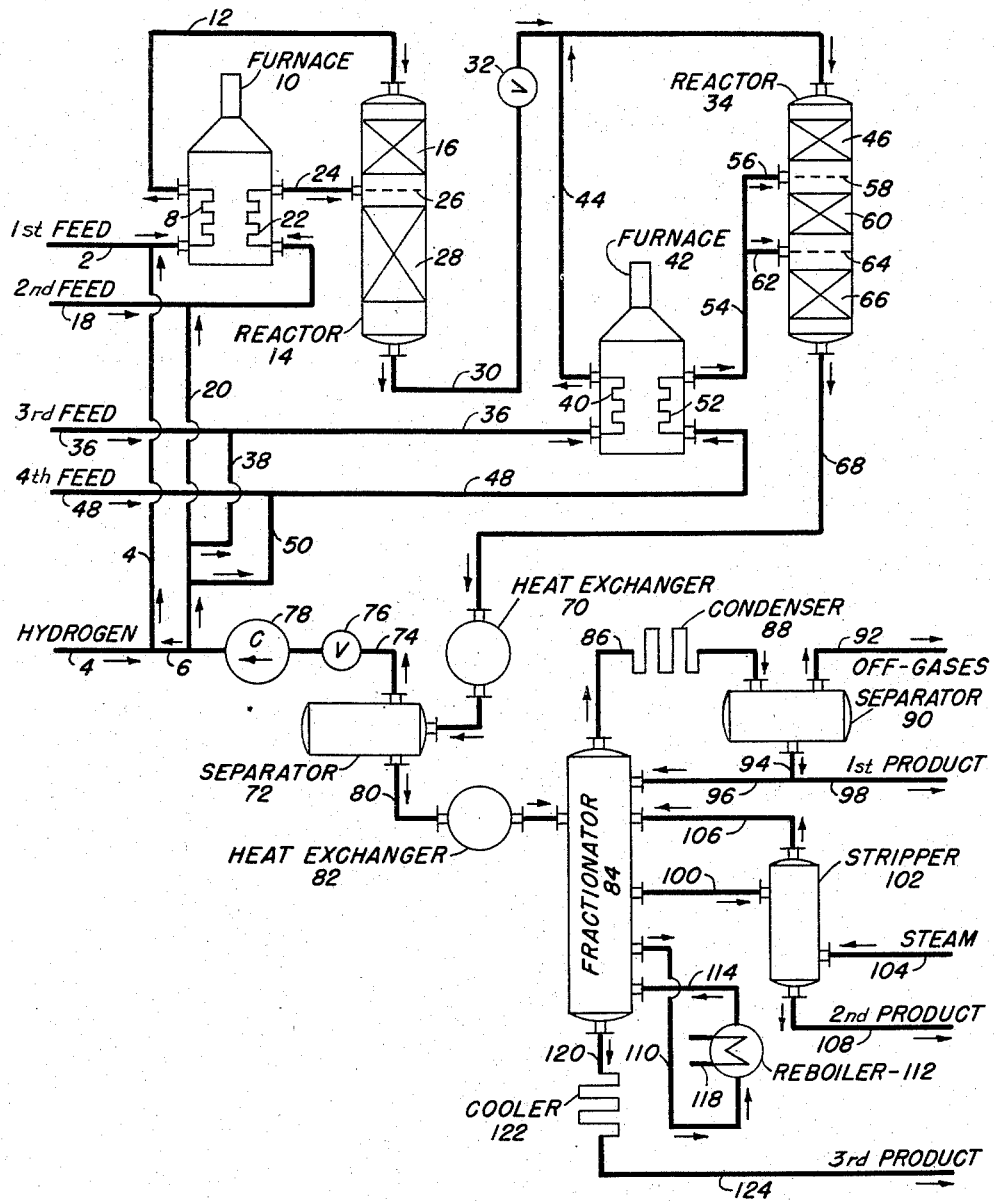

2,878,179
Patented Mar. 17, 1959

2,878,179

PROCESS FOR SELECTIVE HYDROGENATION OF PETROLEUM STOCKS

Harvey Hennig, Crystal Lake, Ill., assignor to The Pure Oil Company, Chicago, Ill., a corporation of Ohio Application September 13, 1955, Serial No. 533,978

5 Claims. (Cl. 208—144)

The present invention relates to a process for hydrogenating petroleum stocks whereby a number of stocks of different properties are simultaneously treated in one hydrogenation unit under different processing conditions.

The basic idea of this invention is that several dissimilar petroleum stocks are hydrogenated in an integrated series of reaction zones under different processing conditions such as temperature, pressure, time of contact and hydrogen partial pressure. A further particular advantage of the invention is that the reactor conditions can be controlled by the conditions applied to the various feeds, rather than by a recycling process wherein excess hydrogen is sent back to the reactors for temperature control as in present practice. This invention is carried out by providing a series of several catalyst zones or catalyst beds in one reactor or in a series of reactors into which various different feed stocks to be subjected to hydrogenation are introduced. The number of reactors and the number of catalyst beds in each reactor depends both upon the number of feed stocks to be treated and upon the exothermic heat of reaction that is releasable or may be released in each catalyst section.

Accordingly, a primary object of this invention is to provide a process for simultaneously hydrogenating a number of feed stocks, differing greatly in character from each other.

Another object of this invention is to provide an integrated process for simultaneously hydrogenating a number of feed stocks under optimum conditions for each feed stock wherein the exothermic heat of one reaction is controlled by the thermal condition of the hydrocarbon feed to the reaction zone.

A third object of the invention is to provide a process wherein the feeds are introduced separately into different reaction zones so that each may be subjected to optimum process conditions of temperature, time of contact, and, to some degree, pressure and hydrogen-to-hydrocarbon ratio.

A fourth object of the invention is to provide a process for simultaneously hydrogenating different feed stocks in a plurality of reaction zones using different catalysts in each zone for optimum conversion of each of the feeds.

Still another object of the invention is to provide a process wherein the feeds are processed with various catalysts under differing conditions to produce separate and totally different end products. The only limitation that may be placed on the number of reaction zones, and on the feeds that may be treated, is the ability of the final separating system to recover the various end-products for further use. It is obvious that if the products from any two feeds are not readily separated by commercial means, the feeds cannot be advantageously treated simultaneously in accordance with this invention. It is also a feature of this invention that there is no removal of reaction products or undesirable by-products between reaction zones, or recycling of hydrocarbons, nor are such steps required in the successful application of the steps of the invention.

Briefly, one embodiment of the process comprises subjecting a refractory stock such as coker gas-oil, heavy catalytic cycle-oil, or a heavy gas-oil high in sulfur compounds, separately or simultaneously, to hydrogenation in a first catalystic zone under conditions to desulfurize, saturate olefinic and diolefinic linkages, and, if desired, partially hydrogenate some aromatic compounds. Coker gas-oil may be obtained from such processes as delayed coking, thermal decarbonization, continuous contact coking, or fluid coking. Heavy catalytic cycle-oil is a product of the catalystic cracking of hydrocarbon oils. Heavy-gas-oil containing 0.2 to 2.0% or more by weight of sulfur compounds may be produced by fractionation of crude petroleum. The products from this first reaction zone pass into a second zone to meet and mix with a second feed stock which is less refractory than the first feed stock. The second feed stock may be a light catalytic cycle-oil, heavy thermal or coker naphtha, or a high-sulphur distillate, such as diesel fuel stock, burning oil, stove oil, or kerosene. The catalytic cycle-oil is produced by catalytic cracking of hydrocarbon oils. Heavy thermal or coker naphtha is generally produced by the coking processes already referred to, or by the thermal cracking or vis-breaking of heavier petroleum stocks. High-sulfur distillates, containing from 0.1 to 2% or more by weight of sulfur come from the fractionation of crude petroleum. The conditions in the second catalytic zone are maintained such that the second feed stock is desulfurized, and any unsaturated aliphatic compounds are saturated. Again, some aromatic compounds may also be partially hydrogenated, if desired. At the same time, the more refractory first feed stock continues to be hydrogenated, and also acts as a heat carrier to minimize the temperature increase due to the exothermic heat of the hydrogenation reactions.

A third stream, which may comprise a feed stock which is less refractory than the first two feed stocks, such as a heavy straight-run, high-sulfur naphtha or a cracked naphtha, is introduced into a third catalytic zone along with the products from the first two catalytic zones. The straight-run naphtha fraction utilized as the third feed may be obtained from the fractionation of crude petroleum. A cracked naphtha for this purpose is obtainable by thermal treatment of heavier petroleum stocks, such as coking of residual fuels, thermally cracking distillates, or vis-breaking. The purpose of the third zone is to desulfurize, and saturate unsaturated aliphatic hydrocarbons while the previous feeds undergo still further reaction. Following this, all of the products are conveyed to a fourth catalytic zone to meet and mix with a fourth feed which may comprise a light, straight-run gasoline or light, cracked naphthas boiling in the range of about 120° to 300° F. This fourth feed, which requires only very mild hydrogenation, mixes with the joint products stream from the first three reactors within the fourth catalytic reaction zone. Within the fourth reaction zone, the less refractory feed is subjected to desulfurization, sweetening, and saturation of olefins and diolefins for the purpose of producing, sweet, low-sulfur, light naphthas with good color, odor and storage stability.

The brief description above illustrates the use of four reaction zones, but a greater or lesser number of reaction zones are contemplated as constituting this invention. The number of zones to be employed will be dictated by the number of feeds to be treated, their relative reactivity, and the purpose for which the products are intended. It follows, then, that the groupings of feed stocks and relative introduction order into the zones listed above are also subject to change, again depending upon the individual characteristics of each feed and on the type of product desired.

The invention is best described in relation to the attached drawing which is a flow diagram of one embodiment of the invention using four different feed stocks. As shown in the drawing, the first feed is charged to the system through line 2. Make-up hydrogen is conveyed by line 4 and joins recycle hydrogen conducted through line 6 to mix with the first feed in line 2 wherein it is conveyed to heating tube 8 within furnace 10. The heated mixture of hydrogen and the first feed stock passes through line 12 into the top of reactor 14. In the top of reactor 14 is located first reaction zone 16. A second feed enters the system through line 18 and mixes with recycle hydrogen from line 20 to pass through coil 22 of furnace 10 and through line 24 into distributor 26 located within reactor 14. The mixture of products from zone 16 and the second feed pass through zone 28 of reactor 14. The entire effluent products from zones 16 and 18 pass through line 30 and pressure-control valve 32 into second reactor 34.

The third feed enters the system through line 36, mixing with recycle hydrogen from line 38, passes through coil 40 of furnace 42, and thence via line 44 to mix with the products in line 30 to enter the top of reactor 34. Zone 46 of reactor 34 is operated under conditions optimum for the third feed material, and the products therefrom pass downwardly in reactor 34.

The fourth feed enters the system through line 48, mixing with recycle hydrogen from line 50, passes through coil 52 of furnace 42, and thence via lines 54 and 56 into distributor 58 located below zone 46 in reactor 34. The mixture of the reaction products and the fourth feed pass into zone 60 of reactor 34. Alternatively, for further control of the reaction, portions of the fourth feed may be sent through line 62 into distributor 64 before entering zone 66 within reactor 34. When heat control is critical, any one or more of the feeds can be similarly separated between several of the catalyst beds as illustrated by passage of a portion of the fourth feed through lines 56 and 62. All of the reaction products leave the reactor through line 68, are cooled in heat exchanger 70, and passed into separator 72. Within separator 72, recycle hydrogen is taken off by line 74 and is recirculated by compressor 78 into lines 6, 20, 38 and 50. Pressure controller 76 serves to maintain the proper reaction pressure in reactor 34. The liquid products from separator 72 pass through line 80 and heat exchanger 82 into fractionator 84. Heat exchanger 82 may be employed to heat the products to the proper temperature for fractionation.

In fractionator 84 the various modified products are separated into several streams. The overhead stream passes through line 86 and condenser 88 into separator 90. Any residual gas separated passes off in line 92 for use as fuel, or to a gas recovery system. The liquid product from separator 90 passes through line 94 and is divided into two parts. One part is returned by line 96 as reflux to fractionator 84, and the other is passed either to a stabilizer, gasoline storage, a fractionator for preparing feed for catalytic reforming, or a naphtha unit by line 98. The use to which the overhead product is put will depend upon the feeds employed in the process, the reaction conditions and the products desired. A side-stream of lighter material for eventual use as kerosine, diesel oil, or furnace oil is removed at line 100 and passes through stripper 102 where it is stripped with steam entering at line 104. The overhead vapors from stripper 102 return to fractionator 84 by line 106. Stripped product is withdrawn through line 108. A reboiler system consisting of line 110, reboiler 112 and return line 114 is provided. Additional side streams may be removed from the fractionator, if desired. Reboiler 112 supplying heat to fractionator 84, may be heated by steam, a reactor effluent, or any other suitable fluids passing through line 118. The bottoms product, or third product, consisting of the heavier material comprising gas-oil suitable for furnace oils or catalytic cracking charge stock, is withdrawn, as another product from the system, through line 120 and passed through cooler 122 into line 124.

It is apparent from this description of the process that the feed entering through line 2 passes over both catalyst bed 16 and catalyst bed 28, and therefore, is subjected to reaction conditions for a longer period of time than the feed entering the system through line 18. Furthermore, one aspect of the invention comprises controlling the temperature in catalyst beds 16 and 28 by controlling the temperature of the feeds in lines 12 and 24, independent of each other but within the limits imposed by the heats of reaction and the relative quantities in each stream.

Further control of the reaction conditions is achieved by operating the reaction zones subsequent to reaction zone 28 at reduced pressure. This is accomplished by the use of pressure-control valves 32 and 76 in lines 30 and 74, respectively. Control of the temperatures in each of the catalyst beds by controlling the temperature of the operation of the heating coils 8, 22, 40 and 52 is of particular importance. The time of contact of each feed in the respective zones is controlled by changing the point of entry of the feed into the reactor. It is apparent from this description of the invention that when treating highly refractory stock as the first feed, a higher hydrogen partial pressure would be required. Thus, all of the hydrogen required for the feed entering at line 2 would be supplied by recycle hydrogen through line 6 plus any make-up hydrogen added by line 4. As the reaction proceeds and some of the hydrogen is consumed and more feeds are being added to the system, a lower hydrogen partial pressure will prevail in the subsequent catalyst beds 28, 46, 60 and 66. Consequently, the hydrogen partial pressure or the hydrogen-oil ratio is increased by admitting more recycle hydrogen through lines 20, 38 and 50.

The catalyst used in each of the reaction zones may be any known hydrogenation catalyst, such as the oxides or sulfides of cobalt, nickel, molybdenum, or tungsten, either singly or combined in varying proportions, either unsupported or supported on a suitable carrier such as clay, alumina, various alumina-silica combinations, or kieselguhr.

Examples of suitable catalysists that may be used are:

3% $CoO+9-10\%$ $MoO_3$ on a support of 95% $Al_2O_3+5\%$ $SiO_2$
3% $CoO_2+12\%$ $MoO_3$ on an alumina support
10–20% $MoS_2$ on an alumina support
Equal weights of $WO_3 \cdot H_2O$ and $NiCO_3$, converted to the sulfides to give a $WS_2$—$NiS$ catalyst.

Different catalysts may be used in the various reaction zones of the system. Since the first reactor or reaction zone 16 is subjected to more severe duty, it may be constructed in duplicate so that one reaction zone can be regenerated while the other is on stream. The succeeding reaction zones 28, 46, 60 and 66 do not usually require frequent catalyst regeneration and may be regenerated at the time of regularly scheduled shut-down.

Any one or more of the plurality of feed hydrocarbons used may be introduced as mixtures to constitute a first feed, second feed, etc., as long as the first feed or first mixed feed is the most refractory stock, the second feed or mixture is less refractory than the first feed or mixture and so on. The third feed stock or mixture will be less refractory than the first or second feeds and the fourth feed or mixture will be the least refractory. Since each feed may constitute a mixture of hydrocarbons from different sources but having comparable refractory properties, the invention is not limited to processing four feeds or using only four reaction zones as described in the drawing. In one embodiment of the invention each feed may constitute a hydrocarbon from a single source and as many as four to seven different reaction zones may be utilized. In another embodiment wherein the indicidual feeds may each comprise a mixture of two or more hydrocarbons of similar refractory properties but from different sources, a greater number of feeds may be processed using a fewer number of reaction zones. In other words, the number of feeds used does not have to correspond to the number of reaction zones used and the invention can be practiced by using both mixtures and single-source hydrocarbons for one or more of the feeds introduced. Similarly, the number of products separated does not have to correspond to the number of feeds introduced into the system.

To illustrate, the following Table I shows how seven low-quality stocks of progressive refractory properties are treated by the process of this invention, giving the conditions used in four zones to produce three separate products, a naphtha, a distillate fuel and a catalytic cracking feed stock.

treated to produce a superior stock for diesel fuel and burning oils of low sulfur content, good storage stability and improved color. The naphtha may be further distilled to produce a heavy naphtha of suitable quality for catalytic reforming, and a light naphtha, good for gasoline blending stock, having high tetraethyl lead susceptibility due to its low sulfur content.

The example illustrates how seven low-quality hydrocarbon stocks are treated by the process of this invention to produce three or more superior stocks for direct use or for further processing to manufacture high-quality motor fuels.

The cobalt molybdate catalyst employed in the example shown on Table I is composed of 3% $CoO$, 9.5% $MoO_3$

Table I

| Catalytic Zone | 1 | | 2 | | 3 | | 4 |
|---|---|---|---|---|---|---|---|
| Catalyst | Cobalt Molybdate | | | | | | Tungsten+ Nickel Sulfide |
| Reaction Conditions: | | | | | | | |
| Average Temp., °F | 800 | | 800 | | 700 | | 700 |
| Average Press., p.s.i. | 600 | | 590 | | 500 | | 490 |
| LVHSV (1) | 3 | | 6 | | 6 | | 3 |
| Hydrogen, c.f./bbl.: | | | | | | | |
| Fresh Make-Up | 1,700 | | ------ | | ------ | | ------ |
| Fresh Recycle | 1,300 | | 1,567 | | 278 | | 282 |
| From previous zone | ------ | | 933 | | 1,622 | | 1,518 |
| Total to zone | 3,000 | | 2,500 | | 1,900 | | 1,800 |
| Consumed | 200 | | 100 | | 100 | | 100 |
| Feed | Heavy Cat. Cycle Oil | Coker Gas Oil | Light Cat. Cycle Oil | Virgin Gas Oil | Heavy Coker Naphtha | Virgin Naphtha | Light Coker Naphtha |
| Sulfur, Wt. Percent | 0.5 | 0.8 | 0.2 | 0.9 | 0.4 | 0.09 | 0.2 |
| Bromine No. | 10 | 50 | 20 | ---- | 45 | ---- | 37 |
| Carbon Res., 10% | 0.3 | 0.4 | 0.1 | 0.1 | ---- | ---- | ---- |
| Distillation (ASTM): | | | | | | | |
| IBP | 550 | 410 | 420 | 430 | 310 | 120 | 110 |
| 50% | 650 | 560 | 520 | 530 | 360 | 250 | 210 |
| 90% | 720 | 700 | 590 | 600 | 395 | 375 | 285 |
| bbl./day | 500 | 500 | 1,500 | 500 | 500 | 1,000 | 1,000 |
| Products | Naphtha | | Distillate Fuel Stocks | | Catalytic Cracking Feed Stock | | |
| Sulfur, Wt. Percent | 0.012 | | 0.09 | | 0.1 | | ---- |
| Bromine No. | 2 | | 2 | | 4 | | ---- |
| Carbon Res., 10% | ---- | | 0.03 | | 0.05 | | ---- |
| Distillation (ASTM): | | | | | | | |
| IBP | 105 | | 400 | | 610 | | ---- |
| 50% | 270 | | 525 | | 655 | | ---- |
| 90% | 405 | | 600 | | 740 | | ---- |
| bbl./day | 2,500 | | 2,000 | | 1,000 | | ---- |

In Table I, (1) LVHSV=Liquid volume hourly space velocity, liquid volumes of oil/hr., per vol. of catalyst.

In the above example, the heavy catalytic cycle-oil and heavier portion of the coker distillate are treated to produce a superior catalytic cracking feed stock having a low sulfur content, improved carbon/hydrogen ratio, and improved carbon residue number (indicative of coke formation upon cracking). The light catalytic cycle-oil feed, light coker distillate, and high-sulfur virgin gas-oil are on a support of activated alumina, $Al_2O_3$. The tungsten-nickel sulfide catalyst is composed of equal weight of $WO_3 \cdot H_2O$ and $NiCO_3$ converted to their respective sulfides, $WS_2$ and $NiS$.

The temperature and pressure conditions within each of the reaction zones are subject to variation from the conditions cited in Table I. The general limits of conditions including the hydrogen ratios may be stated for the individual feeds and mixtures somewhat as follows:

Table II

| No. | Feed Description | Conditions | | | | |
|---|---|---|---|---|---|---|
| | | Zone No. | LVHS [1] | Temp., °F. | Press., p.s.i. | $H_2$, C.F./bbl. |
| 1 | Heavy Cat. Cycle Oil (BR 500–730° F.) | 1 | 0.5–2 | 700–850 | 500–1,000 | 2,000–5,000 |
| 2 | Coker Gas Oil (BR 400–710° F.) | 1 | 0.5–2 | 700–850 | 500–1,000 | 1,800–4,500 |
| 3 | Light Cat. Cycle Oil (BR 400–600° F.) | 2 | 1–2.5 | 700–850 | 500–1,000 | 1,500–3,000 |
| 4 | Virgin Gas Oil (BR 410–610° F.) | 2 | 1–2.5 | 650–800 | 500–1,000 | 1,500–2,500 |
| 5 | Heavy Coker Naphtha (BR 300–400° F.) | 3 | 1.5–3 | 650–800 | 400–800 | 1,400–2,400 |
| 6 | Virgin Naphtha (BR 120–385° F.) | 3 | 1.5–3 | 600–750 | 300–700 | 1,400–2,400 |
| 7 | Light Coker Naphtha (BR 110–295° F.) | 4 | 2–4 | 600–750 | 300–700 | 1,300–2,300 |

[1] Liquid volumes of charge per hour per volume of reactor or catalyst.

From Table II it is seen that some overlap of temperatures between successive zones is possible. The pressures and rates of introduction of hydrogen necessarily overlap to give the proper amount of leeway so that gradations of conditions from zone to zone can be established which are best suited for the individual feeds and to direct the formation of the desired properties in the final products. The ranges given for liquid hourly volume space velocity (LVHSV) shown in Table II refer to the feed specified and all catalyst zones which that feed contacts. In Table I the LVHSV values given applied to each zone only. Thus, the feed to the first zone contacts four sets of catalyst, the LVHSV in each zone is 3, 6, 6 and 3 respectively, for an overall LVHSV of 1. The conditions set forth in Table II apply also where mixtures of the feeds are used. Thus, zone 1 is operated at 700–850° F., and 500–1000 p. s. i. at 200–5000 C. F. of hydrogen/bbl. of feed comprising a mixture of feed 1 plus feed 2 in any proportions. The reactions proposed in Table II may be carried out using seven different successive zones, each under the conditions set forth opposite the individual feeds.

From this description it is seen that the invention has a number of features and advantages. By the process a number of feeds differing greatly in character and having a range of refractory properties can be treated simultaneously to produce separate and totally different end-products. The feed hydrocarbons are introduced separately or as mixtures having similar refractory properties, into different reaction zones so that each feed is subjected to process conditions which are optimum as far as temperature, time of contact, and to some degree the pressure and hydrogen-to-hydrocarbon ratio. The passage of reactants is from one zone to the other, dispensing with the necessity of removal of reaction products or undesirable by-products between reaction zones. Different catalysts can be employed in the various zones for optimum reaction for each feed introduced.

The invention comprises, therefore, broadly the steps of subjecting a refractory stock, or mixture of refractory stocks, to hydrogenation in a first zone under conditions to desulfurize the feed, saturate any olefinic material and transform any ring compounds present. The products formed are passed to a second zone along with a second feed comprising less refractory hydrocarbons or mixtures of such hydrocarbons from different sources. The second zone is operated under conditions designed primarily to desulfurize and hydrogenate the second stock while at the same time partially converting or finishing the first stock and taking advantage of its heat capacity to maintain the reaction conditions in the second zone. The combined reaction products are sent to a third reaction zone along with a third feed hydrocarbon which is still less refractory than the first two feeds or feed mixtures. This third feed may comprise a mixture of selected stocks, and conditions within this third zone are adjusted to desulfurize, hydrogenate and transform the third feed into more desirable stocks, taking advantage of the heat capacity of the products from the first two zones and further completing their reaction and inter-action under milder conditions. The over-all combined products from this third zone may be separated at this point or, preferably, are sent to a fourth zone along with a fourth feed hydrocarbon or mixture which is even more non-refractory.

Conditions in the fourth zone are adjusted to obtain primarily the desulfurization, hydrogenation and transformation, such as color improvement, of the fourth feed again using the heat of the reaction products and unreacted materials from the previous zones to aid the reaction, cause inter-actions and a general leveling of products so that the final overall products may be separated into improved materials. The final products may comprise naphtha suitable for use as gasoline or gasoline blending stock, distillate fuel oils, and catalytic cracking feed stocks of low sulfur content and low carbon residue.

By the term refractory as applied to the feed materials used herein is meant resistance to hydrogenation and reactions associated with hydrogenation.

The amounts of each feed employed may vary with the capacity of the individual reaction zones and available process equipment or the amounts of desired products. In those instances where greater proportions of highly refractory feeds are used as compared with the proportions of less refractory naphtha, the yield of cracking feed stock will be increased and the yield of naphtha, in proportion, will be less. The process is particularly well suited for the conversion of heavy and light catalytic cycle oils, gas oils, and various naphthas into increased yields of light naphtha, distillate fuel stocks, and catalytic cracking feed stock having enhanced properties. Hydrogen for the process is available from cracking, dehydrogenation and reforming reactions to which some of the end-products are advantageously subjected. Thus, part or all of the hydrogen for the process may come from the reforming of the naphtha produced or the cracking of the heavier products produced.

Although the invention has been illustrated by several examples, they are in no way limiting and the only limitations attaching to the invention appear in the appended claims.

What is claimed is:

1. The process of upgrading a plurality of hydrocarbon feed stocks from different sources in a plurality of directly connected reaction zones maintained under hydrogenation conditions comprising introducing a refractory hydrocarbon stock into a first zone maintained at a temperature at least about 800°, introducing a second hydrocarbon feed stock less refractory than the first feed stock into a second reaction zone maintained at a temperature of at least about 750° F., introducing a third hydrocarbon feed stock less refractory than said second feed stock into a third reaction zone maintained at a temperature of at least about 700° F., introducing a fourth hydrocarbon feed stock into a fourth reaction zone maintained at a temperature of at least about 650° F., conveying the reaction products formed into each successive reaction zone, maintaining an incremental decrease in temperature successively in each zone from said first to said fourth zone and separating the combined reaction products from the last zone into at least two products of enhanced properties.

2. The process in accordance with claim 1 in which the first feed stock is selected from the group of heavy catalytic cycle oil having a boiling range of about 500° to 730° F., coker gas oil having a boiling range of about 400° to 710° F. and mixtures thereof, said first reaction zone is maintained at a temperature of between about 700° to 850° F. with pressures between about 500 to 1000 pounds per square inch, said second feed stock is selected from the group consisting of light catalytic cycle oil having a boiling range of about 400 to 600° F., virgin gas oil having a boiling range of about 410° to 610° F. and mixtures thereof, said second reaction zone is maintained at a temperature of about 700° to 850° F. with pressures of about 500 to 100 pounds per square inch, said third hydrocarbon feed is selected from the group of heavy coker naphtha having a boiling range of about 120° to 385° F. and mixtures thereof, said third reaction zone is maintained at a temperature of about 650° to 800° F. with pressures of about 400 to 800 pounds per square inch and said fourth reaction zone is maintained at a temperature of about 600° to 750° F. at a pressure of about 600 to 750 pounds per square inch.

3. The process of upgrading hydrocarbons from different crude oil sources in a plurality of interconnected reaction zones maintained under hydrogenation conditions comprising subjecting a mixture of heavy catalytic cycle oil and coker gas oil to contact with hydrogen in a first reaction zone at a temperature of about 800° F. and a pressure of about 600 pounds per square inch with about 2000 cubic feet of hydrogen per barrel of feed, passing the reaction effluent from the first zone directly into a second reaction zone along with a mixture of light catalytic cycle oil and virgin gas oil at a temperature of about 800° F. and a pressure of about 590 pounds per square inch with about 2000 cubic feet of hydrogen per barrel of feed, passing the reaction effluent from said second zone directly into a third reaction zone along with a mixture of heavy coker naphtha and virgin naphtha at a temperature of about 700° F. and a pressure of about 500 pounds per square inch with about 1900 cubic feet of hydrogen per barrel of feed, passing the reaction effluent from said third reaction zone directly into a fourth reaction zone along with a light coker naphtha at a temperature of about 700° F. and a pressure of about 490 pounds per square inch with about 1800 cubic feet of hydrogen per barrel of feed, the feed to said first reaction zone being the most refractory and the subsequent feeds being successively less refractory, separating from the entire reaction effluent a naphtha, a distillate fuel stock and a catalytic cracking stock, each characterized by their decreased sulfur content, decreased unsaturation and decreased carbon residue.

4. The process in accordance with claim 3 in which the first three reaction zones contain a catalyst comprising cobalt molybdate.

5. The process in accordance with claim 3 in which the fourth reaction zone contains a catalyst comprising tungsten sulfide.

References Cited in the file of this patent

UNITED STATES PATENTS 2,587,987   Franklin _____ Mar. 4, 1952

UNITED STATES PATENT OFFICE
CERTIFICATE OF CORRECTION

Patent No. 2,878,179

March 17, 1959

Harvey Hennig

It is hereby certified that error appears in the printed specification of the above numbered patent requiring correction and that the said Letters Patent should read as corrected below.

Column 2, lines 5 and 11, for "catalystic", each occurrence, read -- catalytic --; column 4, line 42, for "catalysists" read -- catalysts --; line 73, for "indicidual" read -- individual --; columns 5 and 6, Table II, fourth column thereof, in the heading, for "LVHS$^1$" read -- LVHSV$^1$ --; column 8, lines 31 and 32, for "hydrogeneration" read -- hydrogenation --; line 62, for "100 pounds" read -- 1000 pounds --.

Signed and sealed this 30th day of June 1959.

(SEAL)
Attest:

KARL H. AXLINE

Attesting Officer

ROBERT C. WATSON
Commissioner of Patents